US008320913B2

(12) United States Patent
Levy

(10) Patent No.: US 8,320,913 B2
(45) Date of Patent: Nov. 27, 2012

(54) OPTIMIZING THE CONNECTION BETWEEN A MOBILE COMMUNICATION TERMINAL AND A SIGNALING SERVER THROUGH AN ADDRESS TRANSLATION DEVICE

(75) Inventor: Thomas Levy, Paris (FR)

(73) Assignee: Alcatel Lucent, Paris (FR)

( * ) Notice: Subject to any disclaimer, the term of this patent is extended or adjusted under 35 U.S.C. 154(b) by 782 days.

(21) Appl. No.: 12/224,883

(22) PCT Filed: Mar. 21, 2007

(86) PCT No.: PCT/FR2007/050973
§ 371 (c)(1),
(2), (4) Date: Jan. 28, 2009

(87) PCT Pub. No.: WO2007/113427
PCT Pub. Date: Oct. 11, 2007

(65) Prior Publication Data
US 2009/0305700 A1    Dec. 10, 2009

(30) Foreign Application Priority Data

Mar. 30, 2006    (EP) ..................................... 06300304

(51) Int. Cl.
*H04Q 7/20* (2006.01)
(52) U.S. Cl. .................. 455/435.1; 455/418; 455/550.1; 370/328
(58) Field of Classification Search ............... 455/435.1, 455/418, 550.1; 370/328
See application file for complete search history.

(56) References Cited

U.S. PATENT DOCUMENTS

| | | | | |
|---|---|---|---|---|
| 6,108,542 | A * | 8/2000 | Swanchara et al. | 455/434 |
| 7,209,735 | B2 * | 4/2007 | Sato | 455/415 |
| 2002/0106074 | A1 * | 8/2002 | Elliott | 379/372 |
| 2005/0025294 | A1 * | 2/2005 | Matsuhashi et al. | 379/88.17 |
| 2006/0029083 | A1 | 2/2006 | Kettlewell et al. | |
| 2007/0070936 | A1 * | 3/2007 | Stamoulis et al. | 370/328 |
| 2008/0108348 | A1 * | 5/2008 | Kottilingal et al. | 455/435.1 |
| 2008/0186953 | A1 * | 8/2008 | Buckley et al. | 370/352 |

OTHER PUBLICATIONS

Jennings C et al: "Managing Client Initiated Connections in the Session Initiation Protocol (SIP); draft-ietf-sip-outbound-02.txt" IETF Standard-Working-Draft, Internet Engineering Task Force, IETF, CH, vol. sip, No. 2, Mar. 5, 2006 XP015044147 ISSN: 0000-0004, pp. 4, p. 5, p. 10, p. 14.
Rosenberg J Weinberger Dynamicsoft C Huitema Microsoft R Mahy Cisco J: "STUN—Simple Traversal of User Datagram Protocol (UDP) Through Network Address Translators (NATs); rfc3489.txt;" IETF Standard, Internet Engineering Task Force, IETF, CH, Mar. 2003, XP015092725 ISSN: 0000-0003; figure 1, p. 41 line 9-13.

* cited by examiner

*Primary Examiner* — Danh Le
(74) *Attorney, Agent, or Firm* — Harness, Dickey & Pierce

(57) ABSTRACT

A mobile communication terminal (T) comprising connection means ($M_{CN}$) for connecting to access networks ($N_1$, $N_2$) and registration means ($M_{REG}$) for periodically transmitting registration messages to a signaling server (SS) located within a public communication network (PUB) connected to these access networks. It is characterized by a memory ($M_{MEM}$) capable of associating a validity period with at least some of the access networks, and in that the registration means ($M_{REG}$) are provided for transmitting registration messages with a periodicity equal to the validity period associated with the access network ($N_1$, $N_2$) to which the terminal (T) is connected.

10 Claims, 3 Drawing Sheets

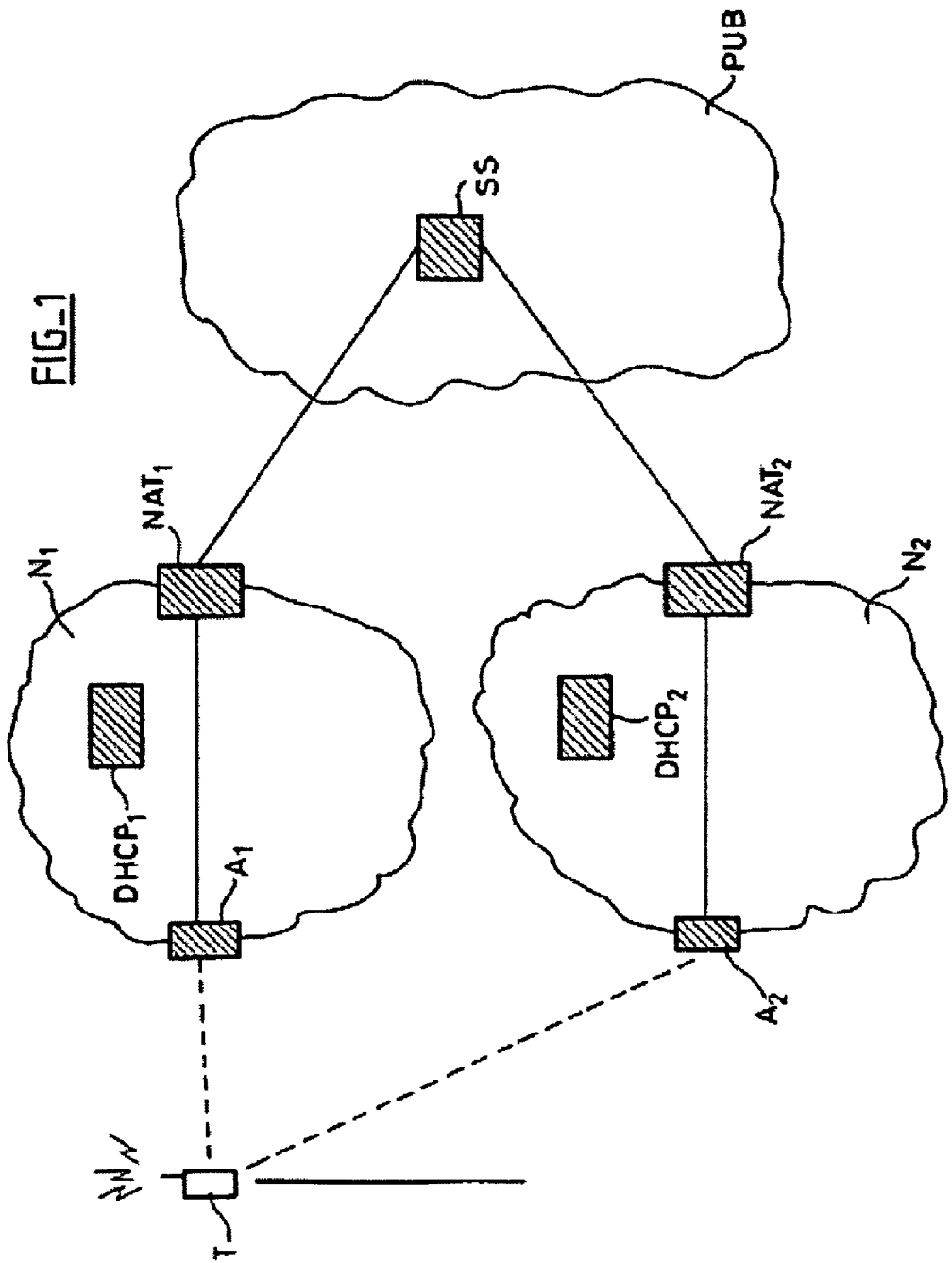
FIG_1

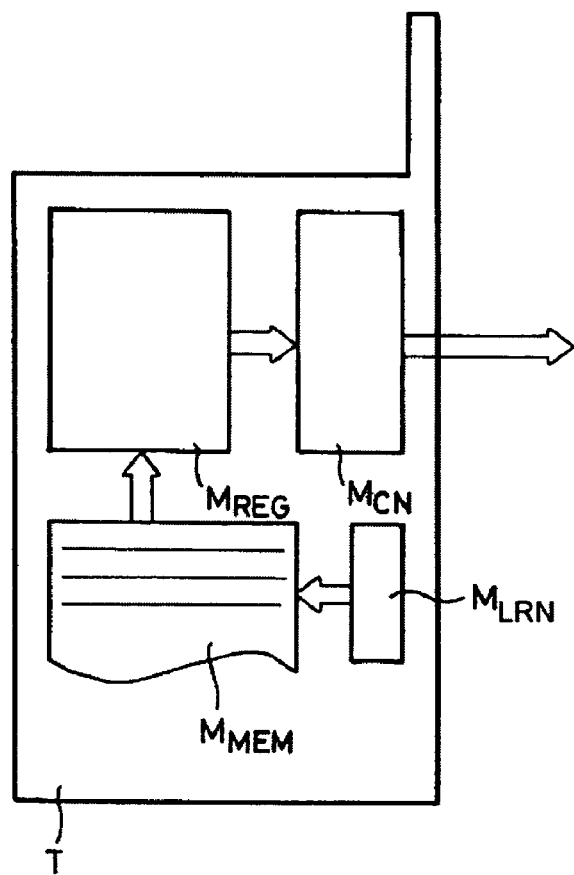
FIG_2
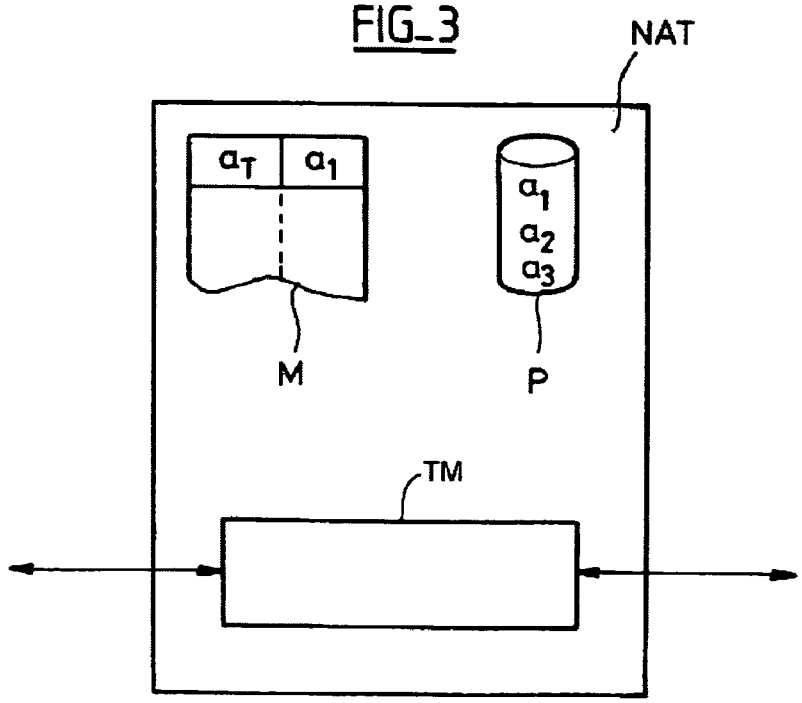
FIG_3

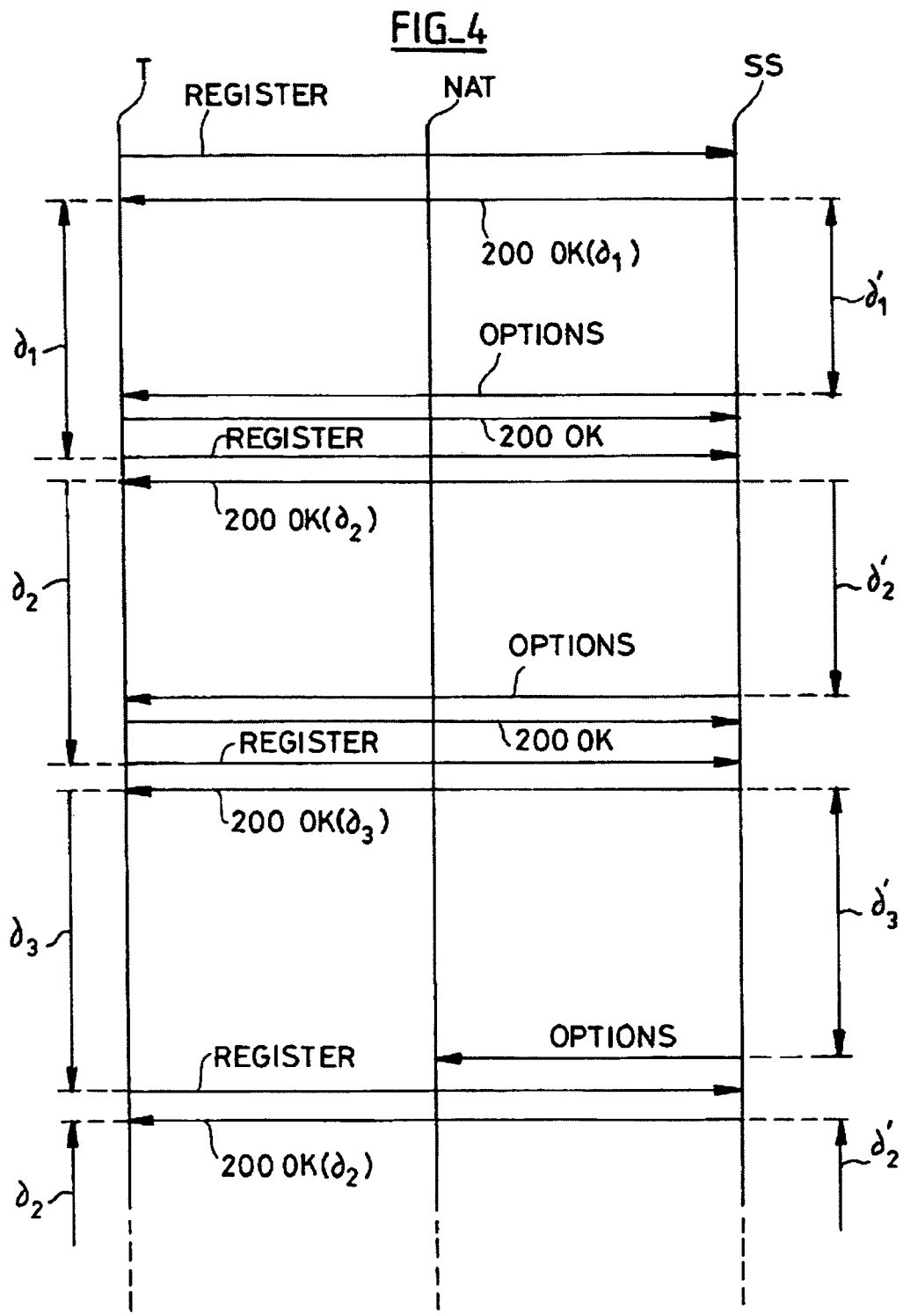

OPTIMIZING THE CONNECTION BETWEEN A MOBILE COMMUNICATION TERMINAL AND A SIGNALING SERVER THROUGH AN ADDRESS TRANSLATION DEVICE

CROSS REFERENCE TO RELATED APPLICATIONS

This is a National Phase of International Application No. PCT/FR2007/050973, filed on Mar. 21, 2007, and further claims priority under 35 U.S.C. §119 to French Application No. 06300604.0 filed on Mar. 30, 2006, the contents all of which are incorporate herein and by reference in their entirety.

The present invention pertains to the transmission of multimedia flows by a data communication network. In particular, it applies to IP (Internet Protocol) telephony, to IP videophone services, etc.

These applications most commonly require a session to be established between the parties. These parties are most commonly multimedia terminals such as telecommunication terminals (GSM or UMTS terminals, etc.), personal digital assistants (PDAs), computers, etc.

This session is established by a so-called "calling" party, which "invites" other parties to join the session. The invitations, as well as other signaling messages, are normally carried by a signaling protocol such as the SIP (Session Initiation Protocol) protocol defined by RFC 3261 of the IETF (Internet Engineering Task Force).

These SIP signaling messages are transmitted over the communication network with the assistance of signaling servers, commonly known as "proxy servers". The main purpose of these signaling servers is to interpret the addresses contained within the signaling messages in order to route them to the receiving party.

In order for the signaling servers to have sufficient knowledge of the communication network, the terminals must be registered with their signaling server. In this manner, each signaling server knows which terminals are connected to itself, and which signaling messages (and calls) may be suitably transmitted over the communication network. Such a registration is typically performed by the SIP protocol's "Register" registration message.

This protocol also includes a message called "Invite", which allows the calling party to initiate a session with a called party.

The global communication network (commonly called "the Internet") may be seen as a connection between private communication networks. These private networks may, for example, be enterprise communication networks. They are connected together via one or more communication networks administered by communications operators.

Quite often, the private networks and the public network are connected by an address translation device, known as NAT (Network Address Translation) devices and described in RFC 3022 of the IETF. The purpose of such a device is to bind the public addresses, which are only used within the private network, to public addresses, which are used within the public network.

Among these NAT devices, network address and port translation devices ("NAPT devices") also exist, which, in addition to the IP addresses, also take into consideration the ports indicated in the IP packets. In the following description, to make reading easier, the acronym NAT will be considered to also encompass NAPT devices or other similar devices: Two-way NAT devices, NAPT redirect/port forwarding devices, Twice-NAT devices, etc.

Also for the sake of clarity, we will use the term "coordinates" to refer to all information contained within the IP packets which are used by a NAT device to identify a piece of equipment or an application (IP addresses, ports, etc.)

The NAT address translation device has access to a pool of public addresses, which normally are much fewer in number than the terminals connected to the private network. Whenever one of these terminals wishes to access the public network, the NAT address translation device assigns it a public address.

A NAPT (Network Address and Port Translation) device may use the same public address for multiple private addresses. In such a case, the binding is performed based not only on IP addresses, but also on the ports used or other information (protocols, etc.). This binding of private and public coordinates is created temporarily. From the viewpoint of the public network, this terminal then possesses the public coordinates assigned by the NAT (or NAPT, etc.) address translation device, and its private coordinates are then transparent for the public network.

This binding is necessarily temporary, so as not to monopolize the public addresses found in the set of public addresses. Additionally, after a certain period of inactivity has passed, the binding is terminated and the assigned public address once again becomes available to be newly reassigned.

This non-usage may, for example, occur when a TCP (Transport Communication Protocol) connection is terminated between the parties on both sides of a NAT address translation device. Once it has been terminated, and after this period of time, known as the expiry time, has lapsed, the binding is terminated, and if the two parties wish to communicate again, they will need to be newly bound. This aspect of the functioning of an address translation device is explained, for example, in the document "NAT Behavioral Requirements of Unicast UDP", by F. Jennings, published in September 2005 in its 5th version and available on the IETF's website with the filename "draft-ieff-behave-nat-udp-05.txt".

A problem arises with the SIP protocol. SIP is based on the lower-level protocol known as UDP (User Datagram Protocol), which, unlike TCP, does not involve the establishment of an end-to-end connection between the parties. With the use of the TCP protocol, a positive action from one of the parties is therefore needed in order to interrupt the TCP connection so that the binding is terminated within the NAT address translation device. However, with the usage of the UDP protocol, the binding may be terminated without any positive action, simply by not sending data packets for a period of time equal to or greater than the expiry time.

The applicant has noted that this will pose an increasing problem with the growing use of the SIP protocol to establish multimedia sessions.

As this SIP protocol is based on UDP, the absence or insufficiency of signaling traffic during a multimedia session causes the session to be interrupted by terminating the NAT address translation device's binding.

Currently, this problem is partially solved by manually setting the validity period of the SIP protocol's signaling messages, so that the clients periodically re-register after a period less than the expiry time of the NAT address translation device. Indeed, the SIP protocol provides that the clients only temporarily register with a signaling server. The "Register" registration message therefore includes a parameter making it possible to specify the validity period beyond which the signaling server closes its "connection" with the client.

Additionally, if the client wishes to remain constantly connected to the signaling server and accessible by the entire communication network, it must periodically re-send "Register" registration messages.

This technique is, for example, described in U.S. patent US2006/029083, filed Feb. 9, 2006; or in the IETF draft, "Managing Client Initiated Connections in the Session Initiation Protocol (SIP)", by C. Mahy, published in March 2006 with the file name "draft-ietf-sip-outbound-02.txt".

This validity period is normally negotiated between the client and the signaling server, but it may also be set manually by the operator.

This validity period for SIP signaling messages may be set to a deliberately short value, in order to guarantee the non-termination of the binding of the NAT address translation device.

The operator may also rely upon the manufacturer's data for the NAT address translation device, or conduct a statistical study, in order to determine the most optimal value for the validity period that best corresponds to this device's expiry time.

However, these methods suffer from serious drawbacks.

Firstly, they require that the operator intervene manually. This is a costly task for the operator, and may cause configuration errors. For example, if the address translation device is changed, the operator must remember to change the value of the validity period accordingly.

Furthermore, choosing too low a value for the validity period of the SIP signaling messages overloads the communication network by sending too many "Register" registration messages.

These problems are fairly small today, but the applicant believes that they will become more critical as the usage of the SIP protocol for establishing multimedia sessions grows.

These problems will be worsened by the development of mobility and roaming solutions: a single mobile terminal may connect to a plurality of signaling servers depending on, in particular, its geographic location. With every hand-over, the problem of the termination of the association within a NAT address translation device reoccurs.

The present invention proposes to solve these problems, by incorporating within the mobile communication terminals a memory that associates the access networks with a validity period corresponding to the period of sending registration messages.

More precisely, the invention pertains to a mobile communication terminal comprising connection means for connecting to access networks and registration means for periodically transmitting registration messages to a signaling server located within a public communication network connected to the access networks. This mobile terminal is characterized in that it further has a memory capable of associating a validity period with at least some of said access networks and in that the registration means are provided for transmitting registration messages with a periodicity equal to the validity period associated with the access network to which the mobile terminal is connected.

In one implementation of the invention, the mobile communication terminal further has learning means for, every time that it connects to a new access network, initiating a learning phase to determine a validity period and updating the memory with the association between said validity period and said new access network.

In one embodiment of the invention, the access networks are identified by an identifier of a unique device of the access networks. This unique device may, for example, be a DHCP dynamic address server. These identifiers may, for example, be MAC addresses.

In one embodiment of the invention, the memory matches up an age to each association between an access network and a validity period, and when the age reaches a threshold, the association is erased from the memory in order to keep it from becoming overloaded.

In this manner, by memorizing the validity duration to use for (at least) some access networks, the mobile communication terminal may establish an optimal connection with the signaling server. At the same time, the number of signaling messages and connection interruptions is minimized.

The invention and its benefits will become more clearly apparent in the following description, with reference to the attached figures:

FIG. 1 diagrams the general architecture within which the signaling server is found, according to the invention.

FIG. 2 depicts a functional architecture of a mobile communication terminal according to the invention.

FIG. 3 diagrams the functional architecture of an address translation device.

FIG. 4 depicts the flows of exchanges between the multiple parties to the communication, according to the invention.

As indicated above and depicted in FIG. 1, the invention operates within a multimedia session established between a terminal T and a second terminal, not shown. The word "terminal" refers to any communication device enabling the establishment of a multimedia session, i.e. voice over IP, videophone services, etc. It may be a mobile terminal compliant with the UMTS (Universal Mobile Telecommunications System) or GPRS (Global Packet Radio System) standards, or a personal digital assistant (PDA), a microcomputer, a device such as those sold by the company Blackberry™, etc. In the same fashion, the access networks N1, N2 to which the mobile terminal may connect may themselves comply with various technologies (GSM, UMTS, etc).

In the jargon of the SIP protocol, these terminals are considered clients. In the following description, the terms "client" and "terminal" shall be considered equivalent.

In a multiparty conference call, multiple other terminals may be parties to the multimedia session.

The public network PUB includes a signaling server SS that enables the routing of the signaling messages exchanged between the parties.

FIG. 1 essentially illustrates the part of the architecture of the communication networks which connect this signaling server SS and a communication terminal T.

The access networks $N_1$, $N_2$ and the public communication network PUB are connected to one another by address translation devices $NAT_1$, $NAT_2$. The signaling messages exchanged between the terminal T and the signaling server SS are therefore transmitted through these address translation devices $NAT_1$, $NAT_2$.

Within the access networks $N_1$, $N_2$ the terminals and nodes have addresses which are assigned independently of the global network. In other words, there is no guarantee undertaken to tell whether an address has already been assigned elsewhere in the world. The purpose of the address translation devices $NAT_1$, $NAT_2$ is to insulate the access networks by ensuring that the private addresses are never used in communications with the public network PUB.

FIG. 3 diagrams an address translation device $NAT_1$, $NAT_2$. The NAT address translation device $NAT_1$, $NAT_2$ has a pool P of public addresses available $a_1$, $a_2$, $a_3$. These addresses, which may be used throughout the entire public network, are provided by the IANA (Internet Assigned Numbers Authority), the organization in charge of creating address maps and uniquely assigning public addresses within the public network.

Whenever the terminal T wishes to communicate outside of the private network PRI, and the signaling server SS assigns it one of the available addresses $a_1$ from among the pool P of public addresses, as well as a port for an NAPT device. This binding of private and public coordinates is saved in a lookup table M (for "Map").

The address translation device further has translation means TM for translating the fields of the IP addresses related to the coordinates of terminal T in both directions, and to adjust the checksum fields accordingly. In this manner, the packets coming from the terminal T, when output from the address translation device, will have source addresses $a_1$. Conversely, the packets coming from the signaling server SS and being sent to said terminal T will have destination addresses $a_1$; the only one which is known to this server. The translation means TM of the address translation device then use the lookup table M to edit the fields so that the packets are then output through the interface of the private network PRI with the private address $a_T$ as their destination address. These packets may then be correctly routed within the private network PRI to the destination terminal T.

The address translation device further possesses a timer enabling it to measure for how long a binding has not been used. Upon the expiration of this expiry time, the binding ends.

FIG. 2 functionally diagrams the architecture of the mobile communication terminal T.

This terminal T possesses connection means $M_{CN}$ enabling it to connect to access networks $N_1$, $N_2$. In the example of FIG. 1, it is assumed that the mobile terminal T is initially connected to the network $N_1$ by the intermediary of an access node or base station $A_1$. When it moves in the direction of the arrow, it exits the geographic area associated with the base station $A_1$ and the access network $N_1$, entering that of the base station $A_2$ and the access network $N_2$. The mobile communication terminal T then performs a hand-over, and the connection means $M_{CN}$ terminate the previous connection and establish a new connection with the access network $N_2$.

In order to become known to the signaling server, the registration means periodically transmit registration messages to said signaling server SS through an address translation device $NAT_2$. In the SIP protocol, these registration messages are "Register" messages.

The mobile communication terminal T further comprises a memory $M_{MEM}$ which associated a validity period with at least some of the access networks $N_1$, $N_2$.

This memory $M_{MEM}$ is used by the registration means $M_{REG}$ in order to determine the periodicity with which it must transmit "Register" registration messages to the signaling server SS.

In this manner, knowing the access network to which the mobile communication terminal T is currently connected, it is possible to search the memory $M_{MEM}$ for the validity period associated with it, and to use it as the periodicity for transmitting "Register" registration messages over said access network. Whenever the terminal T is handed over to another access network, the registration means then use a new validity period provided by the memory $M_{MEM}$ and corresponding to the new access network.

This memory $M_{MEM}$ may take the form of a lookup table matching a network access identifier ($ID_1$, $ID_2$, $ID_3$) and a validity duration value ($d_1$, $d_2$, $d_3$), as depicted by the following table:

| | |
|---|---|
| $ID_1$ | $d_1$ |
| $ID_2$ | $d_2$ |
| $ID_3$ | $d_3$ |

Multiple implementations are possible wherever the manner of identifying an access network is concerned. These various manners and the type of identifier may further depend upon the technology of the access networks.

An identifier may be chosen as being the identifier of a unique device of the access networks, i.e. a device of which only a single copy normally exists within a given network. This, for example, is true for a DHCP ("Dynamic Host Configuration Protocol") dynamic address server, as defined by RFC 2131 of the IETF.

One possible identifier may be the MAC address of this DHCP dynamic address server. Each access network is indeed equipped with one and only one DHCP dynamic address server, which makes it possible to assign a private address to the terminal T whenever said terminal T connects to said network.

The MAC ("Medium Access Control") address, by definition, makes it possible to uniquely identify a device connected to a communication network. As an access network normally possesses only one DHCP dynamic address server, its MAC address may be used to identify the access network.

In the specific situation of a WiFi network, as described by the 802.11 standard, the access network may be uniquely identified by the extended service set identifier (ESSID, or SSID for short).

In the specific situation wherein a single access network is connected to the public communication network PUB by more than one address translation device, it is possible to then use multiple identifiers for that same access network. Conventionally, each address translation device corresponds to one DHCP dynamic address server. Consequently, the memory $M_{MEM}$ may, as above, associate a validity period value with the MAC address of the DHCP server.

The memory $M_{MEM}$ may initially be filled out manually by configuration.

However, it is preferable to use learning methods enabling the mobile terminal T to enrich the contents of this memory dynamically and automatically.

In one implementation of the invention, every time the mobile communication terminal T connects to a new access network (i.e. a network whose identifier is not already found within the memory $M_{MEM}$), it may initiate a learning phase.

To do so, it has access to learning means $M_{LRN}$ whose purpose is to determine a validity period for this new access network and to update the memory $M_{MEM}$ with the association between this validity period and the new access network.

This dynamic and automatic aspect enables the mobile communication terminal T to not require any manual configuration when it connects to an unknown access network. In this manner, even if the user of the mobile terminal moves to another region (such as for business travel or a vacation), his or her mobile communication terminal T remains capable of connecting to access networks optimally.

In one embodiment of the invention, the memory ($M_{MEM}$) matches up an age to at least some associations between access networks and validity periods. This age is the time that has passed since the last visit to the access network. If this age reaches a certain threshold, the association is erased from the contents of the memory $M_{MEM}$.

This characteristic makes it possible to keep the memory $M_{MEM}$ from gradually becoming overloaded. Indeed, it may be assumed that some access networks will only be visited in special situations, and that it is therefore beneficial to delete the validity period associated with them, at the risk of re-initiating a new learning procedure when a new connection is established.

The threshold may be predetermined, and it may potentially be a function of the memory capacities of the mobile communication terminal. Potentially, it may also be an option for the user of the mobile terminal T, because this function is dependent on the user's behavioral type.

One example of a learning mechanism is given by RFC 3489 of the IETF, entitled "STUN—Simple Traversal of User Datagram Protocol (UDP) Through Network Address Translators (NATs)", by J. Rosenberg, J. Wenberger, C. Huitema and R. Mahy, published in March 2003. A particular server, known as a STUN server, may then be used to analyze the requests associated with the terminals, and determine the association times.

FIG. 4 depicts the flows of signaling messages between the parties to the communication for another example of a learning mechanism. However, it is important to note that the invention is not limited to this particular example; rather, it may generally apply to all learning procedures enabling a mobile communication terminal T to enrich its memory $M_{MEM}$ with new associations.

In this particular implementation, the learning means $M_{LRN}$ of the mobile communication terminal determine the validity period by receiving reply messages from the signaling server SS.

This figure possesses a downward-oriented temporal axis. Each vertical line is representative of a network element: the leftmost line represents the terminal T, the middle line represents the address translation device NAT, and the right line the signaling server SS.

The horizontal arrows represent the signaling messages. As we will see later on, these signaling messages may be of various natures: "Register" registration messages, "Options" test messages, "200 Ok" reply messages, etc., and other types not used in the invention. From a vocabulary standpoint, it is important to note that the "Options" signaling message is not generally a test message: it holds this meaning only within the present invention.

The first message is a registration message. In the SIP protocol, it may be a "Register" message, as described in paragraph 10 of the abovementioned RFC 3261.

This message enables terminal T to make itself known to the signaling server SS so that said server can integrate it into its information base that combines all terminals (more generally "SIP clients") known to said signaling server SS.

This message includes a header comprising a set of mandatory fields. As indicated in paragraph 8.1 of RFC 3261, an SIP message must include at least the following fields: "To", "From", "CSeq", "Call-ID" "Max-Forwards", and "Via". Furthermore, a "Contact" field may be incorporated into the "Register" registration message. The information contained within RFC 2361 relating to the SIP protocol's message fields are within the reach of a person having ordinary skill in the art.

The SIP protocol provides that a validity period for the "Register" registration message to be indicated within this message. It offers two ways to specify this information:

the validity period may be indicated within an additional field known as "Expires", described in paragraph 20.19 of RFC 3261;

the validity period may be indicated within an "Express" parameter in the "Contact" field, as specified in sections 10.2 and 20.10 of said RFC 3261.

By default, the SIP clients (i.e. the terminal T) do not offer a validity period.

Upon receiving this "Register" registration message, the signaling server SS analyzes the fields of the message, and may determine whether or not the sending terminal T is located behind an address translation device NAT. This determination may, for example, be made by analyzing the content of the "Via" field of the header.

As explained in paragraph 8.1.1.7 of RFC 3261, the "Via" field indicates the network nodes through which the message is transmitted. By analyzing the "Via" field(s), it is entirely possible to determine whether a registration message has passed through an address translation device NAT, and even to tell its address.

If the signaling server SS detects that the client T is located behind an address translation device NAT, a phase of learning an optimal validity period is initiated.

To do so, the signaling server determines an approximate expiry time for the binding by successively sending test messages after an increasing wait time until the termination of the binding is detected.

First, the signaling server SS replies to the registration message with a "200 Ok" replay message specified in the SIP protocol by RFC 3261. This reply message includes a validity period set to a first value $d_1$. This first value $d_1$ is set in such a way as to be lower than the expiry time of the binding of the address translation device NAT. This value, therefore, is deliberately not very high, e.g. on the order of 15 seconds.

As with the "Register" registration message, the "200 Ok" reply message may contain the value $d_1$ in (at least) two different places, opening the possibility for two embodiments of the invention:

In a first embodiment, the validity period is transmitted in the "Expires" field of the "200 Ok" reply message.

In a second embodiment, the validity period is indicated in an "Expires" parameter of the "Contact" field.

The client T is therefore instructed by this "200 Ok" reply message that it must re-send a "Register" registration message at the end of a period $d_1$.

In parallel, the signaling server SS waits for a period of time $d_1'$ slightly shorter than the first validity period $d_1$ before sending a test message to the client T.

More generally, during any learning phase, the reply messages to the registration messages contain a validity period slightly longer than the time to wait before sending the next test message.

This test message is meant to check whether or not the address binding within the address translation device NAT is still active.

It may be implemented by the "Options" message of the SIP protocol, which allows one party to request the capabilities of another party.

An "Options" message includes the same fields as a "Register" registration message. It also has a "Contact" field.

If the binding between the public and private addresses of the client T is still active within the address translation device NAT, the test message is transmitted to the client T. When it is received, the client T sends back a "200 OK" reply message which, in turn, travels through the address translation device NAT before reaching the signaling server SS. The signaling server SS is then informed that the binding is still active within the address translation device NAT. It may then deduce from this information whether the binding's expiry time is greater than the wait period $d_1'$.

It may then test a higher value for this period.

In reply to the second "Register" registration message, the signaling server SS replies with a "200 Ok" reply message containing a validity period set to a second value $d_2$, greater than the first value $d_1$.

In parallel, the signaling server SS waits for a period of time $d_2'$ slightly shorter than the second validity period $d_2$ before sending a test message to the client T, such as an "Options" message.

As before, if the binding is still active within the address translation device NAT, the signaling server receives a "200 Ok" reply message to its test message.

It can once again increment the values of the periods of time, known that the expiry time of the address translation device NAT is therefore still greater than the wait period $d_2'$.

Upon receiving the third "Register" registration message, the signaling server SS thus replies with a "200 Ok" reply message containing a validity period set to a third value $d_3$, greater than the second value $d_2$.

In parallel, the signaling server SS waits for a period of time $d_3'$ slightly shorter than the third validity period $d_3$ before sending a test message to the client T, such as an "Options" message.

In the example depicted in FIG. 2, it is assumed that this third period is greater than the expiry time of the address processing device NAT. When this is true, the device cannot transmit the "Options" test message to the client T. Consequently, the signaling server SS never receives any "200 Ok" reply message.

Nevertheless, at the end of the validity period $d_3$, the terminal T transmits a "Register" registration message, which creates a new public address/private address binding within the NAT address translation device. This "Register" registration message is then transmitted through the address translation device NAT to the signaling server SS When it receives said "Register" registration message, the signaling server determines that because it did not receive any "200 Ok" reply message to its "Options" test message, the expiry time of the address translation device NAT is less than the last value tested $d_3'$. More precisely, it may determine that the approximate value for this expiry time is between the value $d_2'$ and the value $d_3'$.

Numeric Examples

The periods of time used may be those found in the following table:

| | |
|---|---|
| $d_1$ = 15 seconds | $d_1'$ = 10 seconds |
| $d_2$ = 25 seconds | $d_2'$ = 20 seconds |
| $d_3$ = 35 seconds | $d_3'$ = 30 seconds |
| $d_4$ = 45 seconds | $d_4'$ = 40 seconds |

In this example, the increment between two consecutive values is 10 seconds. However, this is only an example, and it remains entirely possible to use other numeric values.

In a first embodiment of the invention, the learning phase ends when a test message has received no reply. The signaling server SS may then assume that the preceding value $d_2$ is the optimal value for the validity period of "Register" registration messages, and use it afterwards. It then replies to the "Register" registration message with the value $d_2$.

It will reply with this value to any new "Register" message coming from the same terminal T, in a usage step.

Likewise, it may use this same value $d_2$ with any new terminal located behind the same address translation device NAT without triggering a phase of learning the expiry time. In this embodiment, the signaling server SS therefore has a table enabling it to associate an approximate expiry time to any address management device NAT.

Whenever it detects that a given client is located behind a given address translation device, it has means for directly using the approximate expiry time associated with this given address translation device, without going through the learning step.

This embodiment makes it possible to bypass phases for learning these times-to-expire, and to go directly to a usage step, and therefore to save network resources by reducing the number of messages which are exchanged during the learning step.

In a second embodiment of the invention, the signaling server may seek to further optimize the approximate value to use as the validity period of "Register" registration messages. It can then proceed dichotomously and test the wait period and intervening validity period, until it obtains a sufficient approximation of the expiry time of the address translation device NAT. Only then does it move to the usage step, when the value thereby determined is used in its exchanges with the client.

According to the invention, there is therefore a lapse of time during which the terminal T is not accessible over the communication network. Indeed, once the test message includes a value greater than the expiry time of the address translation device, the terminal T is inaccessible until the next "Register" registration message. In this manner, if an "Invite" invitation message arrives at the signaling server intended for the client T, it will not even require a reply, because, at that precise moment, it is no longer connected to the client T.

This lapse of time, however, is negligible if the increments between two consecutive values $d_i/d_i+1$ are sufficiently low.

However, it may be provided for that in the event of a call to this client T during this lapse of time, the signaling server re-routes this call to a voice server, informing the caller that the client T will be available in a few seconds.

The invention claimed is:

1. A mobile communication terminal configured to connect to a plurality of access networks and to periodically transmit registration messages to a signaling server located within a public communication network connected to said access networks, said terminal further having a memory configured to associate a validity period with at least some of said access networks, in such a way that said registration messages are transmitted by said communication terminal with a periodicity equal to the validity period associated with the access network to which said terminal is connected.

2. The mobile communication terminal of claim 1, wherein said validity period is relative to a validity period of a binding between a private address of said mobile communication terminal and a public address, saved by an address translation device linking an access network to said public network.

3. The mobile communication terminal of claim 1, further configured to initiate, if said mobile communication terminal connects to a new access network, a learning phase for determining a validity period and updating said memory with the association between said validity period and said new access network.

4. The mobile communication terminal of claim 3, further configured to determine said validity period by receiving reply messages from said signaling server.

5. The mobile communication terminal of claim 4, wherein said validity period is contained within an "Expires" field, or within an "Expires" parameter of a "Contacts" field of said reply messages.

6. The mobile communication terminal of claim 1, wherein said access networks are identified by an identifier of a unique device of said access networks.

7. The mobile communication terminal of claim 6, wherein said unique device is a DHCP dynamic address server.

8. The mobile communication terminal of claim 6, wherein said identifiers are MAC addresses.

9. The mobile communication terminal of claim 1, wherein said memory is configured to match an age to each association between an access network and a validity period and to erase said association from said memory if said age reaches a threshold.

10. The mobile communication terminal of claim 1, wherein said registration messages are "Register" messages of the SIP protocol.

* * * * *